Oct. 4, 1960 W. J. FINNEY ET AL 2,955,203

SIGNAL DEMODULATOR (ENVELOPE)

Filed April 10, 1959

INVENTORS
WILLIAM J. FINNEY
HERBERT L. PETERSON

BY Richard C. Reed

ATTORNEY 2,955,203

SIGNAL DEMODULATOR (ENVELOPE)

William J. Finney, Accokeek, Md., and Herbert L. Peterson, 5521 24th Ave., Hillcrest Heights, Md.

Filed Apr. 10, 1959, Ser. No. 805,650

2 Claims. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

The present invention relates to a detector circuit for amplitude modulated waves which is particularly useful with signal encoding systems.

In most systems employing amplitude modulated signals the envelope or information of the carrier is detected by first rectifying the signal and then integrating the rectified signal using an integrating circuit with a fairly long time constant. The integrating circuit is usually a capacitor which discharges through a resistor over a number of cycles of the carrier wave. Thus when the amplitude of the carrier is rising, the integrating circuit, although dropping in potential between carrier peak values, nevertheless rises in potential on the average by charging during the peak values of the wave. When the amplitude of the carrier is decreasing, the decaying potential of the capacitor follows the envelope more closely, although it is clear that the decay slope cannot match all of the various slopes that will occur in the envelope.

There is, therefore, always a certain degree of distortion in the information signal resulting from the above method of detection. The degree of distortion will depend on the complexity of the information involved. In telemetering systems the nature of the information is often so complex that this type of distortion can be intolerable.

An additional problem arises when the detected information is converted to binary code. The encoding process frequently involves a timed sequence of operations each of which must be based on the same instantaneous amplitude of the information signal. If the instantaneous amplitude varies radically during this sequence of operations, an entirely erroneous value may be encoded. Large variations in successive carrier peaks, however, are necessary to convey certain types of analoged data.

It is an object of the present invention, therefore, to provide a detector which retains more faithfully the information supplied by the peak values of an amplitude modulated carrier than detectors formerly employed for this purpose.

It is a further object of the present invention to provide a detector which supplies a voltage analog of the envelope of an amplitude modulated carrier in the form of discrete steps which are ideally suited for driving an analog to digital encoder.

These and other objects of the invention will be better understood with reference to the accompanying drawings in which.

Figure 1:
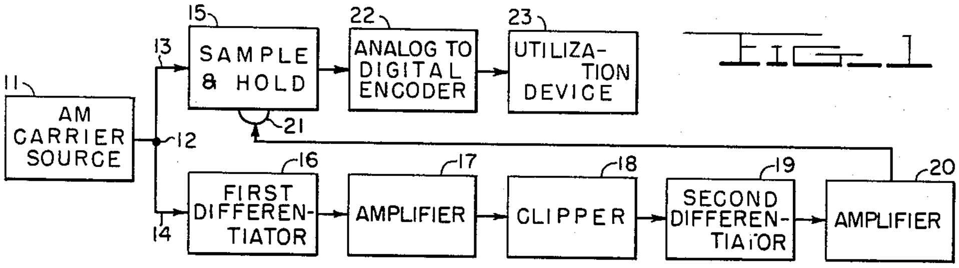
Fig. 1 shows a block diagram of the present invention.

Referring to Fig. 1 the circuit of the invention is shown connected to a source 11 of amplitude modulated carrier waves. From the input terminal 12 of the circuit, the signal travels along first and second branches 13 and 14 to a Sample and Hold circuit 15 in the first branch and a first differentiator 16 in the second branch. The Sample and Hold circuit basically performs two functions. The first is a gating function so that only small portions of the carrier which are centered about the peak of each cycle will be passed on to subsequent circuits. The second is a memory or storage function which provides a sustained output at the level of one small peak portion of the carrier until the arrival of a subsequently sampled or gated portion.

The gate portion of the Sample and Hold circuit is controlled by a signal derived in the second branch. The carrier, after passing through the first differentiator 16, is shifted in phase a quarter cycle so that the beginning of each cycle coincides in time with the peak of the original carrier at the input of the Sample and Hold circuit. The signal is then strengthened, if necessary, by an amplifier 17 and fed to a clipper circuit 18 which discards the portions of each cycle above a fixed level. This level is set at a small fraction of the peak value of the carrier at the maximum depth of modulation, so that the clipper output is substantially a square waveform. This waveform is passed through a second differentiator 19 to obtain steep narrow pulses corresponding to the leading and trailing edges of the square waves. The resultant signal may again be strengthened, if necessary, by means of an amplifier 20 which may also rectify the pulses to eliminate those which correspond in time to the trailing edges of the square waves. Usually the gate in the Sample and Hold circuit 15 is responsive to only one polarity of the control signal.

The remaining pulses from the amplifier 20 are applied to the control input 21 of the gate portion of the Sample and Hold circuit 15. Since these pulses correspond in time to the peaks of carrier, the signal stored in the output of the Sample and Hold circuit will be a stepped waveform where the vertical portion of each step corresponds to the time position of each peak and horizontal portions represent the peak amplitudes. If both the positive and negative peaks of the carrier are desired, full wave rectifiers, not shown, may be used in the second branch and at the carrier input of the Sample and Hold circuit. Other arrangements for achieving this same result will be obvious to those skilled in the art.

The circuitry of the second branch may take on any of the forms which are well known to those skilled in the art. The differentiators 16 and 19, for example, may consist of the usual series resistor and capacitor shunted across the carrier input with the differentiator output across the resistor. In such a differentiator the value of the resistor is negligible compared to the impedance of the capacitor at the frequency of the carrier. The clipper circuit 18 may be a conventional diode clipper or a push-pull amplifier driven beyond saturation. Circuits of the types described above are discussed in chapter 18 of F. E. Terman, Electronic and Radio Engineering, fourth edition, published in 1955, by McGraw-Hill, Inc.

Figures 2, 3:
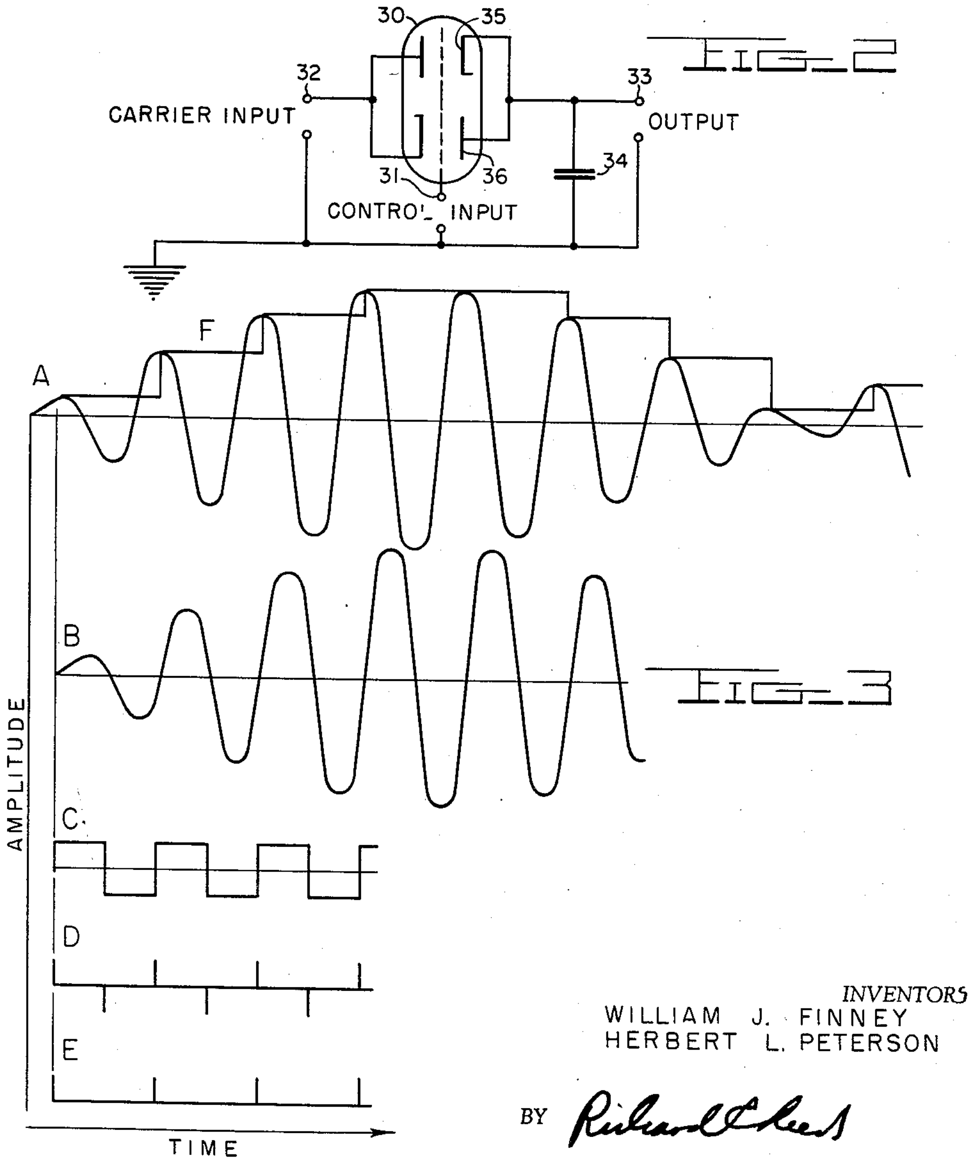
Fig. 2 shows one form of the Sample and Hold circuit of Fig. 1.
Fig. 3 shows the waveforms which occur at various points in the detector of Fig. 2.

A simple form of Sample and Hold circuit 15 is shown in Fig. 2. The gating function is performed by a pair of antipoled triodes, a typical case being two halves of a 12BH7 indicated in the drawing as vacuum tube 30. The plate of one of these triodes is connected to the cathode of the other and vice-versa. The grids are interconnected to form the ungrounded terminal 31 of the gate control input. One of the plate-cathode junctions 32 is used for the ungrounded gate input terminal and the remaining junction 33 is for the ungrounded gate output terminal. The memory or hold function of the circuit is provided by a capacitor 34 which interconnects the ungrounded output terminal 33 and ground, the latter being taken from the source of amplitude modulated waves.

When the pulses from the amplifier 20 are applied to the grids of vacuum tube 30, one or the other of the gate triodes conducts depending on the relative potentials of the capacitor and the instantaneous peak value of the carrier. If the carrier is the higher potential, the capacitor 34 charges through the upper triode having its cathode 35 connected to the capacitor. Conversely, when the capacitor has the higher potential, it discharges through the lower triode having its plate 36 connected thereto. The action of the gate may be improved by using a negative bias on the grid terminal 31 to increase the impedance of the gate in its closed state. At very high frequencies there will be some capacitive coupling between the plates and cathodes which can be reduced by conventional neutralization arrangements well known in the art. Fig. 2 is merely exemplary and may be replaced with other well known gating and recording systems.

Fig. 3 shows the various waveforms generated in the detector of Fig. 1. The waveform A is the modulated carrier as applied to the input of Sample and Hold circuit 15. The waveform B is the output signal from the first differentiator 16. It is identical to A except for a phase shift of a quarter cycle. The waveform C is the output signal from the clipper 18. The waveform D is the output signal from the second differentiator 19 with the steep narrow pulses generated by leading and trailing edges of the clipper output signal. The waveform E shows the output of amplifier 20 with the pulses generated by the trailing edges of the clipper output removed by rectification. It will be noted that the remaining pulses and the peaks of the amplitude modulated carrier A correspond in time. Superimposed on waveform A is the output waveform F of the Sample and Hold circuit in Fig. 1.

A digital encoder 22 may be connected to the output of the Sample and Hold circuit as shown. The step levels provide undistorted peak values for the encoder and the maximum time periods for the encoding circuits to operate on these values. The output of the encoder may be connected to a utilization circuit 23 which may involve digital computers and the like. In addition to digital encoders, the detector may be used with similar advantage to convert analog signals to pulse width modulated or pulse repetition rate modulated signals.

Obviously many modifications and variations of the present invention are possible in the light of the above teachings. It is therefore to be understood that within the scope of the appended claims the invention may be practiced otherwise than as specifically described.

What is claimed is:

1. A detector for carrier wave amplitude modulated signals comprising, a signal input for said carrier waves, a Sample and Hold circuit connected to said signal input having a pulse input and an output, said Sample and Hold circuit including gate means to sample the instantaneous peak amplitude of said carrier wave in response to a signal applied to said pulse input and storage means to supply a steady signal proportional to said peak amplitude to said output, and a control pulse generating means for generating control pulses in synchronism with said carrier wave and phased to coincide with the peaks of said carrier wave, said pulse generating means having a synchronizing input coupled to said signal input and an output coupled to gating means in said Sample and Hold circuit and including a first differentiating means for advancing the phase of the carrier at the output thereof substantially a quarter of a cycle with respect to the carrier phase at said signal input, and means to generate a narrow gating pulse corresponding to leading edge of each cycle of said phase-advanced carrier.

2. The detector according to claim 1 wherein said pulse generating means further includes wave shaping means for altering the waveform of the carrier from sinusoidal to square in character, and second differentiating means for deriving a series of narrow pulses corresponding to leading edges of said square wave; said first differentiating means, said wave shaping means and said second differentiating means being connected successively in cascade between said signal input and said pulse control input.

References Cited in the file of this patent

UNITED STATES PATENTS 2,583,832 Goldberg ---------------- Jan. 29, 1952
2,686,869 Bedford ---------------- Aug. 17, 1959